United States Patent [19]

Balmat

[11] 4,135,911

[45] Jan. 23, 1979

[54] RHODIUM RECOVERY FROM HYDROFORMYLATION STILL HEEL WITH TRIARYL PHOSPHITE LIGAND

[75] Inventor: Jean L. Balmat, Kennett Square, Pa.

[73] Assignee: E. I. Du Pont de Nemours and Company, Wilmington, Del.

[21] Appl. No.: 905,200

[22] Filed: May 12, 1978

Related U.S. Application Data

[63] Continuation-in-part of Ser. No. 820,046, Jul. 28, 1977.

[51] Int. Cl.$^2$ .................... C22B 13/04; C01G 55/00
[52] U.S. Cl. ................................. 75/0.5 AB; 75/108; 75/121; 252/411 R; 252/412; 252/413; 252/414; 252/415; 252/416; 260/604 HF; 423/22
[58] Field of Search ............ 423/22; 75/0.5 AB, 108, 75/121; 252/411–416

[56] References Cited

U.S. PATENT DOCUMENTS

| | | | |
|---|---|---|---|
| 3,071,551 | 1/1963 | Robinson et al. | 252/411 |
| 3,539,634 | 11/1970 | Olivery et al. | 260/604 HF |
| 3,547,964 | 12/1970 | Oliver | 260/429 R |
| 3,899,442 | 8/1975 | Kummer et al. | 252/416 |
| 3,901,822 | 8/1975 | Browning et al. | 252/416 |
| 3,920,449 | 11/1975 | Onoda et al. | 423/22 |
| 4,021,463 | 5/1977 | Friedrick | 252/413 |

FOREIGN PATENT DOCUMENTS

| | | | |
|---|---|---|---|
| 879601 | 8/1971 | Canada | 423/22 |
| 1295537 | 10/1967 | Fed. Rep. of Germany | 423/22 |
| 1290535 | 1/1968 | Fed. Rep. of Germany | 423/22 |
| 1280707 | 7/1972 | United Kingdom | 423/22 |

*Primary Examiner*—Herbert T. Carter

[57] ABSTRACT

A process for recovering rhodium present in a still heel from the hydroformylation of an unsaturated hydrocarbon wherein rhodium and a triaryl phosphite ligand were used by a process comprising (a) pretreating the still heel with a compatible organic solvent or a mixture thereof, at least 5 ml of water per 100 g of still heel, oxygen gas or a precursor thereof and sufficient base to produce a pH of 2 to 7 in the reaction mixture after rhodium precipitation;
(b) heating to a temperature of from 0° to 80° C to oxidize the triaryl phosphite ligand to the corresponding phosphate compound;
(c) heating the mixture from (b) for from about 15 minutes to about 120 minutes at about 115° C to about 175° C to precipitate zero valent rhodium; and optionally purifying the precipitated rhodium from (c) by
(d) separating the rhodium precipitate;
(e) washing the rhodium precipitate with a solvent-acid solution at a pH of 3 to 4;
(f) treating the rhodium precipitate with an alkaline reducing solution to reduce the trivalent rhodium impurity to zero valent rhodium;
(g) quenching the rhodium with glacial acetic acid;
(h) separating the rhodium;
(i) washing the rhodium with an acid solution at a pH of 3 to 4;
(j) drying the rhodium in an inert atmosphere at from 250° to 400° C; and
(k) oxidizing the rhodium at a temperature of from 300° to 900° C to convert the rhodium to $Rh_2O_3$.

41 Claims, No Drawings

RHODIUM RECOVERY FROM HYDROFORMYLATION STILL HEEL WITH TRIARYL PHOSPHITE LIGAND

CROSS REFERENCE TO RELATED APPLICATION

This application is a continuation-in-part of my co-pending application Ser. No. 820,046, filed July 28, 1977.

BACKGROUND OF THE INVENTION

1. Field of the Invention

This invention relates to a process for recovering rhodium from a still heel from the hydroformylation of olefins. More specifically, this invention relates to a process for recovering rhodium from a still heel from the hydroformylation of olefins in the presence of triaryl phosphite ligands and a rhodium complex catalyst.

2. Prior Art

Rhodium metal is known in the art as a catalyst in hydroformylation reactions. In such reactions the rhodium may be complexed with various ligands to render it catalytically active. In U.S. Pat. No. 3,998,622 there is disclosed a method for preparing a novel rhodium metal form from a still heel from the hydroformylation of olefins where the ligand in the catalyst complex is a trialkyl phosphorus compound. However, the process of U.S. Pat. No. 3,998,622 with a triaryl phosphorus ligand does not result in the recovery of at least 90% of the rhodium nor does it produce a rhodium that can be readily dissolved in a triaryl phosphite ligand catalyst solution.

U.S. Pat. No. 3,547,964 discloses the recovery of Group VIII metal complexes by a process comprising treating a nonpolar solvent containing tars and high boiling hydroformylation products with a sufficient amount of a peroxide to precipitate the Group VIII metal complex and separating and recovering said precipitate therefrom. This invention is limited, however, to triaryl phosphine ligands.

SUMMARY OF THE INVENTION

Now it has been found that the rhodium present in a still heel from the hydroformylation of unsaturated aliphatic hydrocarbons wherein a triaryl phosphite ligand is involved can be recovered and the rhodium recovered can be purified and converted to a form that is highly soluble in a triaryl phosphite ligand and carbon monoxide.

Thus, in accordance with the invention, a process has been found for recovering the rhodium, that is present in a still heel from the hydroformylation of an unsaturated hydrocarbon, in a form that can be solubilized in carbon monoxide and a triaryl phosphite ligand, said still heel comprising rhodium triaryl phosphite complex catalyst, triaryl phosphite ligand and high boilers, said process comprising (a) pretreating the still heel with a mixture of (1) a compatible organic solvent or a mixture thereof, (2) at least 5 ml of water per 100 g of still heel, (3) oxygen gas or a precursor thereof and (4) sufficient base to produce a pH of 2 to 7 in the reaction mixture after rhodium precipitation;

(b) heating the solution from (a) to a temperature of from 0° to 80° C. to oxidize the triaryl phosphite ligand to the corresponding phosphate compound; and (c) heating the mixture from (b) for from about 15 minutes to about 120 minutes at about 115° C. to about 175° C. to precipitate the rhodium.

The thus recovered rhodium is useful as an intermediate in a process for preparing a highly soluble rhodium that is useful as a catalyst in the hydroformylation of an unsaturated hydrocarbon.

However, the rhodium thus precipitated has an extremely low dissolution in a triaryl phosphite ligand and carbon monoxide. In order for the precipitated rhodium to be dissolvable to any great extent in said ligand and carbon monoxide, the rhodium must be converted from the zero valent form to $Rh_2O_3$. Further treatment of the rhodium precipitate can achieve even higher levels of dissolution of at least 95% by weight.

Accordingly, rhodium thus precipitated is washed with a solvent-acid solution with a pH of from 3 to 4 and then oxidized to $Rh_2O_3$ to render it dissolvable in a triaryl phosphite ligand and carbon monoxide. Dissolution of the thus oxidized rhodium of at least 90% by weight is attained.

Dissolution of the thus precipitated rhodium, if merely washed with the solvent-acid but without oxidation to $Rh_2O_3$ is attained only to the extent of less than 5% by weight. Dissolution of the thus precipitated rhodium, after merely oxidizing the rhodium to $Rh_2O_3$ is attained only to the extent of less than 20% by weight.

When the thus precipitated rhodium is not washed with the solvent-acid, the rhodium surface sinters under oxidation conditions and thus gives poor dissolution in the triaryl phosphite ligand and carbon monoxide.

Further treatment of the rhodium thus precipitated followed by oxidation of the rhodium to $Rh_2O_3$ can yield rhodium oxide that is at least 95% by weight dissolvable in a triaryl phosphite ligand and carbon monoxide. Accordingly, the rhodium precipitated from (c) above is separated and treated to solubilize it by washing the separated rhodium precipitate with a solvent-acid solution having a pH of 3 to 4 to remove residual still heel; treating the rhodium with an alkaline reducing solution that will reduce trivalent rhodium organo phosphorus impurities to zero valent rhodium; quenching the rhodium with glacial acetic acid to destroy any residual reducing solution; separating the rhodium; washing the rhodium with an aqueous aceticacid solution with a pH of from 3.0 to 4.0; drying the rhodium in an inert atmosphere at a temperature of from 250° to 400° C.; and oxidizing the rhodium with oxygen at a temperature of from 300° to 900° C. to convert the rhodium to $Rh_2O_3$.

The thus treated rhodium is in the form of $Rh_2O_3$ and is at least 90% by weight dissolvable (preferably at least 95% by weight dissolvable) in a triaryl phosphite ligand in the presence of carbon monoxide to form a catalyst complex used in the hydroformylation of unsaturated hydrocarbons.

The process of the present invention can result in the recovery of at least 90% by weight of the rhodium present in the still heel, (preferably at least 99% by weight) and after further treatment, wherein the rhodium is converted to a form soluble in CO and a triaryl phosphite ligand can result in the recovery of rhodium that is to the extent of at least 90% by weight dissolvable (preferably at least 95% dissolvable).

The rhodium triaryl phosphite complex catalyst that is present in still heels of this invention is a homogeneous catalyst solution comprising rhodium and biphyllic ligands complexed with carbon monoxide and hydrogen through coordinate bonding. The biphyllic ligands are triaryl phosphite compounds of the formula

wherein $R_1$, $R_2$ and $R_3$ are the same or different aryl groups having 1 to 12 carbon atoms. Representative examples of such aryl groups include phenyl, tolyl, p-chlorophenyl, diphenyl and cyanophenyl. Representative examples of the ligand include triphenyl phosphite, tri(p-chlorophenyl) phosphite, tri(cyanophenyl) phosphite, tri(p-methoxyphenyl) phosphite, tri(diphenyl) phosphite, dimethyl phenyl phosphite, ethyl ditolyl phosphite and other combinations within the scope of the above formula. The preferred ligand is triphenyl phosphite.

The phosphite ligand forms a complex with rhodium and carbon monoxide as described in U.S. Pat. No. 3,527,809 and the complex catalyzes the hydroformylation reaction of unsaturated hydrocarbons from which the still heel of the present invention is derived. An excess of the phosphite over that which is required to complex the rhodium in the hydroformylation reactions described herein must be used in order to favor linear vs branched hydroformylation. The excess ligand is also necessary to insure the stability of the rhodium catalyst through the hydroformylation reaction.

The still heel referred to herein is a heel or tail that remains after the distillation of the reaction product from the hydroformylation of unsaturated hydrocarbons, e.g., olefinic cyclic acetals, conducted in the presence of hydrogen, carbon monoxide and a rhodium triaryl phosphite ligand complex catalyst. The reaction product of said hydroformylation which has been distilled to remove cyclic acetal aldehyde product comprises unreacted olefinic cyclic acetals, excess ligand, a rhodium triaryl phosphite complex catalyst and high boilers. The still heel of the process of this invention is thus a residual tail from said distillation. By rhodium triaryl phosphite complex catalyst is meant a coordination compound of rhodium in complex combination with carbon monoxide, hydrogen and a triaryl phosphite ligand. Generally, the pH of the still heel is acidic. The pH may range from 1.0 to about 8.0.

Hydroformylation reactions, from which the still heel of the present invention are derived, are reactions of unsaturated hydrocarbons, e.g., olefinic cyclic acetals, with hydrogen and carbon monoxide in the presence of a rhodium triaryl phosphite complex catalyst at temperatures and pressures well known in the art. Rhodium triaryl phosphite complex catalysts used are solubilized complexes of rhodium in combination with carbon monoxide, hydrogen and trialkyl phosphite ligand. After the reaction products from the hydroformylation of the unsaturated hydrocarbon are distilled to recover the desired product, the residue of high boilers, rhodium triaryl phosphite complex catalyst and ligand are usually recycled back to the hydroformylation reaction until high boilers accumulate to the point where a small portion of the still heel must be purged to maintain the high boilers at a constant concentration. The value of rhodium is such that economics do not permit the discarding of all or any significant portion of the purged still heel. At rhodium concentrations in the still heel of more than 50 ppm, the process of the present invention permits the recovery of at least 90% by weight of the rhodium (at higher concentrations at least 99% by weight). The rhodium recovered is purified to convert it to a form that is highly soluble in a triaryl phosphite ligand and carbon monoxide. Preferably, the rhodium, after purification, is at least 90% soluble and most preferably at least 95% soluble in a triaryl phosphite ligand and carbon monoxide.

For example, the still heel of the present invention is obtained by first charging commercially available $Rh_6(CO)_{16}$ into a pressure vessel with an olefinic starting material, e.g., 2-vinyl-5-methyl-1,3-dioxane, solvent and ligand. After flushing with nitrogen, the pressure vessel is sealed and pressurized with carbon monoxide and hydrogen to 35 to 150 psig at a hydrogen to carbon monoxide ratio of 1:1 and after a period of time the reaction is complete. The product consists of various aldehydes, unreacted starting material, cyclic acetals, ligand, rhodium complex catalyst and high boilers. This is subjected to distillation to recover cyclic acetals, starting material and aldehydes. A residue made up of rhodium complex catalyst, ligand and high boilers (HB) remains. The still heel of the process of the present invention can conveniently be illustrated by reference to a specific hydroformylation reaction. Thus, 2-vinyl-5-methyl-1,3-dioxane is hydroformylated in the presence of carbon monoxide hydrogen, zero valent rhodium and triphenyl phosphite; and the reaction product thereof is distilled to remove the products indicated in the equations below. The residue from the distillation consists of rhodium complex catalyst, higher boilers and triphenyl phosphite.

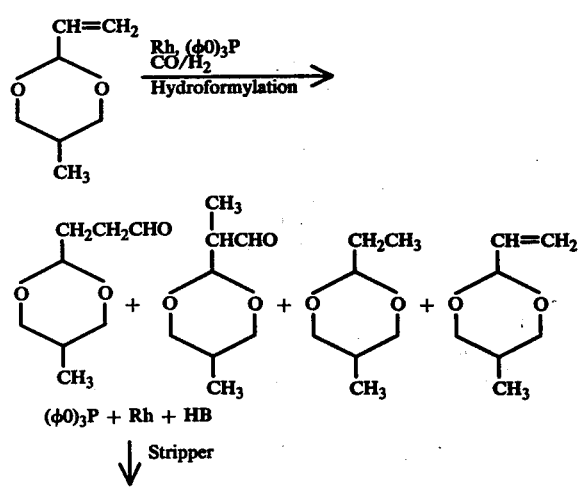

-continued

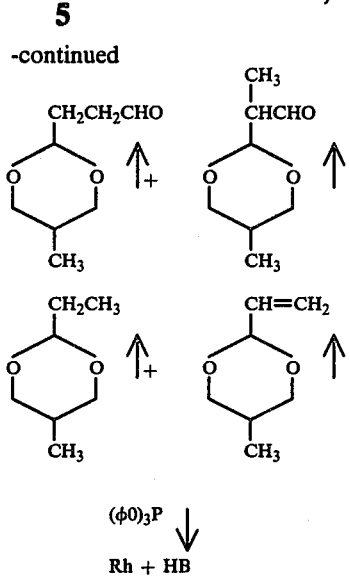

Rhodium, recovered by the process of the present invention and converted to the form of $Rh_2O_3$ from this residue of HB, ligand and rhodium complex catalyst was added to triphenyl phosphite and carbon monoxide at a pressure of 4,000 psig and was at least 90% by weight converted to a homogeneous complex solution at 150° to 175° C. The dissolution can be accomplished at any pressure of carbon monoxide, e.g., from atmospheric to 10,000 psig. Generally, carbon monoxide pressures of from 200 to 5,000 psig are sufficient.

The organic solvent in the pretreatment step of the process of this invention must be compatible with the still heel. The organic solvent is mixed into the still heel to lower its viscosity and to solubilize the water added in the still heel. Any compatible organic solvent or any mixture thereof that will reduce the visocisity of the still heel and solubilize the water may be used. Low molecular weight alcohols and ketons are suitable solvents. Methanol, acetone and methyl ethyl ketone are preferred organic solvents.

Representative examples of the aforesaid organic solvents include methanol, methyl ethyl ketone, acetone, ethanol, propanol, isopropanol, diethyl ketone, methyl propyl ketone, ethyl propyl ketone and mixtures thereof.

Oxygen gas or a precursor thereof is used in the pretreatment step of the process of the present invention to oxidize the triphenyl phosphite ligand to triphenyl phosphate. What is meant by a precursor of oxygen gas is any compound which, under the conditions indicated herein, will yield oxygen gas and will not contaminate the rhodium. Representative examples of a precursor of oxygen gas include hydrogen peroxide and ozone. The preferred precursor is hydrogen peroxide because of its availability. The amount of oxygen or precursor depends on the still heel and the amount of triphenyl phosphite present. Generally, an excess of oxygen or of a precursor thereof over that amount required to oxidize the triphenyl phosphite to triphenyl phosphate is required because of decomposition reactions and other reactions that occur with other organic materials. The amount of the excess is not critical, but is regulated based on convenience and economy.

The amount of water depends on the still heel. The water defined herein includes water in the base solution as well as water added as such. The amount of water required in the pretreatment step must generally be at least 5 ml per 100 g of still heel. The upper limit of water is that amount of water that will not cause the still heel to separate into two liquid phases. The water added must be enough to maximize the rhodium precipitated but less than enough water to cause the formation of two liquid phases. Thus, the maximum amount of water is dependent on the solubility of the water in the organic solvent and the amount of said solvent. It was found to be preferable to use 36 to 40 ml of water per 100 g of still heel treated with 53 ml of methanol.

The base for adjusting the pH of the still heel of the present invention may be any base material that is soluble in the still heel water mixture of the present invention and that will not form any interfering precipitation. The base may be weak or strong. For example, sodium hydroxide or salts of weak acids and strong bases can be used. Organic bases such as the quaternary ammonium hydroxides also are suitable for bases, e.g., tetramethyl ammonium hydroxide. From the standpoint of availability, the preferred base is selected from the group consisting of alkali metal hydroxide and alkaline earth metal hydroxides. The most preferred base is the alkali metal hydroxides of which sodium or potassium hydroxide are most preferred.

The amount of base required will vary depending on the particular still heel utilized. Generally, the amount of base required will be that amount that will give the reaction mixture, after rhodium is precipitated from the still heel, solvent, water and oxygen mixture a pH of from 2 to 7, preferably 3 to 6. An excess of base will reduce the percent of the rhodium recovered from the rhodium available in the still heel. Depending on the nature of the still heel, the pH may be such that no base need be added.

The mixture of still heel, organic solvent, water, base and oxidant is heated to a temperature of 0° to 85° C., preferably 20° to 85° C. until the triaryl phosphite ligand is oxidized to the corresponding phosphate compound.

Pretreatment with oxygen gas at 50 psig and 75° C. will completely oxidize the ligand in 60 minutes. Hydrogen peroxide at 75° C. is equally effective in 15 minutes. A sample of the pretreated mixture after heating to from 0° to 80° C. is tested by gas chromatograph to determine when the triaryl phosphite is oxidized to the corresponding phosphate.

The second heating of the pretreated still heel mixture for the purpose of precipitating the rhodium at 115° to 175° C. is preferable under an atmosphere or vapor space of inert gas. The vapor space before the heating step thus is preferably filled with an inert gas which preferably is nitrogen. The preferred temperature range is from about 150° to about 165° C. At 100° C., no rhodium is precipitated and above 185° C., polymerization of the still heel into a gel or solid occurs. Generally, the time at the temperatures indicated can vary from 15 minutes to 120 minutes. At shorter periods of time, the yield of rhodium recovered is lower. Longer periods are operable, but the benefits in rhodium recovered are not proportional to the time of reaction. Thus, greater reaction time yields smaller increases in recovery than when the time is between 15 minutes and 120 minutes.

The rhodium may be most conveniently separated from the still heel by centrifuging or filtration. Separation by centrifuge or filter is well known in the art. The thus recovered rhodium precipitate is washed with the solvent-acid solution and then oxidized to convert the zero valent rhodium to $Rh_2O_3$ with oxygen at atmospheric or higher pressures and temperatures of from 300° to 900° C. to permit the dissolution of the recovered rhodium in the triaryl phosphite ligand.

Alternatively the thus recovered rhodium precipitate is further treated before oxidation to improve its dissolution in the triaryl phosphite ligand. The rhodium precipitate that was separated from the still heel is washed with the solvent-acid solution with a pH of from 3 to 4 for the purpose of removing residual still heel from the surface of the rhodium. The residual still heel on the surface of the rhodium recovered will affect the solubility of the rhodium in carbon monoxide and ligand. The presence of the rather small amounts of trivalent rhodium organo phosphorus impurities on the surface of the recovered rhodium are sufficient to prevent greater than 90% by weight solubility of the recovered rhodium. While this washing of the rhodium precipitate is required to improve the solubility of the rhodium, the resulting rhodium without oxidation to $Rh_2O_3$ would not possess the solubility in the ligand of more than 5% by weight. However, the recovered rhodium can be made at least 90% by weight dissolvable in the ligand by merely oxidizing to $Rh_2O_3$ after the solvent-acid washing.

The washing of the rhodium with solvent-acid solution of a pH of 3 to 4 permits the rhodium to be retained in agglomerated form thereby making the rhodium more easily separable from the reaction mixture. Without pH control of this washing with said solvent-acid solution, some of the rhodium would be lost or not recovered in the separation due to the fineness of the particles.

The solvent-acid solution is a solution of a solvent as defined above. Preferred solvents are methanol and acetone. The acid may be any acid. However, glacial acetic acid is preferred because of its ease in attaining the desired pH range and because it leaves no undesired residual on drying. Little to no water is present in the solvent-acid solution. Acids such as hydrochloric and nitric require so little amounts to achieve the desired pH that the amount of water present can easily be minimal.

After washing, the recovered rhodium can be further purified to increase its dissolution in ligand. The washed rhodium is treated with an alkaline reducing solution that will reduce the trivalent rhodium organo phosphorus impurity to zero valent rhodium. Any reducing agent which will reduce the trivalent rhodium to zero valent rhodium can be used. The amount of reducing agent is that amount that will convert all the trivalent rhodium present to zero valent rhodium. The preferred reducing agent is sodium borohydride. The amount of trivalent rhodium present that must be converted to zero valent rhodium is relatively small but its conversion is essential to achieving a rhodium that is at least 95% soluble in the triaryl phosphite ligand.

It is convenient to conduct the reducing treatment at ambient temperatures. Generally, the temperature is from 25° to 75° C. for this reducing step.

The reducing solution is made alkaline with a base (as defined hereinbefore) to stabilize the reducing solution. For example, sodium hydroxide is added to stabilize $NaBH_4$ to prevent spontaneous decomposition that may occur under acid conditions.

The thus treated rhodium is quenched with glacial acetic acid. The glacial acetic acid neutralizes the base, destroys residual reducing agent and quickly achieves a pH between 3 and 4 and preferably about 3.2 that permits rhodium agglomeration and ease in separating the rhodium from the liquid suspension that results. If not agglomerated, some rhodium is lost or not recovered.

The second separation of the rhodium may be by any means within the skill of the art. However, centrifuging and filtration are preferred.

The thus separated rhodium is washed with water containing sufficient acetic acid to bring the pH of the wash water to from 3 to 4. The washing permits the rhodium to be retained in agglomerated form thereby making separation easier. The washing is continued until the rhodium is free of sodium salts such as, for example, sodium acetate and sodium phosphate. The above described solvent-acid solution at a pH of from 3 to 4 may also be used to wash the thus separated rhodium. However, in such a case, the amount used is greater than the aqueous acetic acid wash in order to remove said sodium salts.

The washed rhodium is dried in an inert atmosphere at a temperature of from 250° to 450° C., preferably 325° to 350° C., until all water and acetic acid are removed. The time necessary to remove all water and acetic acid may vary depending on the thickness of the rhodium and the temperature used. For example, 30 minutes in an inert atmosphere of argon at 325° C. was required to remove all water and acetic acid from a 100 mg sample of rhodium 1 mm thick.

The dried rhodium is oxidized with oxygen gas at 300° to 900° C. to $Rh_2O_3$. Oxidation of the rhodium to $Rh_2O_3$ is essential for obtaining essentially complete dissolution of the rhodium oxide in the presence of triaryl phosphite and carbon monoxide. Temperatures below 300° C. will not result in the formation of $Rh_2O_3$ while the temperatures above 900° C. result in dissociation of the $Rh_2O_3$. The preferred temperature is 450° to 900° C. and most preferably the temperature range is 525° to 650° C.

Oxidation of the rhodium to $Rh_2O_3$ may be at atmospheric pressure or higher pressures. Generally, at higher pressures lower temperatures may be used to maximize conversion to $Rh_2O_3$. For example, at 1 atmosphere of oxygen and 625° C. after 1 hour, 94% of the rhodium was converted to $Rh_2O_3$, while at 136 atmospheres of oxygen and 525° C. after 16 hours, 100% of the rhodium was converted to $Rh_2O_3$.

The process of the present invention decreases in efficiency or percent or rhodium recovered as the amount of rhodium in the still heel decreases. It was found that where the rhodium concentration in the still heel was 50 ppm or more, a recovery of at least 90% by weight of the rhodium in the still heel could be achieved of which at least 90% by weight could be treated to render it soluble in a triaryl phosphorus ligand and carbon monoxide. At concentrations below 50 ppm of rhodium in the still heel, less than 90% by weight recovery could be achieved, but at such lower concentrations of rhodium, there is no longer a need economically to recover as large a percentage of the rhodium present in the still heel as compared to where the rhodium concentration is, e.g., 50 to 1,500 ppm.

In the following examples wherein the present invention is further illustrated, all percentages and parts are by weight unless otherwise indicated.

EXAMPLE 1

Precipitation

To a mixture of 100 g of a still heel from the hydroformylation of 2-vinyl-5-methyl-1,3-dioxane and 42 g of methanol was added a mixture of 31 g water and 13 ml 30% hydrogen peroxide. This was heated with stirring at 75° C. for 15 minutes. Two ml of 4N sodium hydroxide were added. The entire mixture was charged to a 300 ml stainless steel stirred autoclave and the vapor space flushed with nitrogen. The reaction mixture in the closed autoclave was heated to 160° C. and the temperature maintained for 70 minutes. The contents of the autoclave, after being cooled to room temperature, were centrifuged to separate the precipitated rhodium black (finely divided zero valent rhodium) from the liquid phase. The pH of the filtrate was 3.4. The precipitate contained 99.5% of the rhodium in the still heel.

Purification

The precipitate after the separation was washed free of still heel with methanol adjusted to a pH of 3.2 with acetic acid. The rhodium present in small concentration as $Rh^{+3}$ organo phosphorus compounds was reduced to metallic rhodium by treatment with sodium borohydride. One hundred milligrams of methanol-washed precipitate was treated at room temperature with 20 ml of a solution containing 200 mg sodium borohydride dissolved in 0.1N sodium hydroxide. The precipitate was washed free of caustic and the accompanying sodium salts with an initial quench using glacial acetic acid followed by water washings (adjusted to a pH of 3.2 with acetic acid). The rhodium content of the precipitate was 99.5%.

Oxidation

The rhodium was dried in an inert (argon) gas stream at 350° C. for 30 minutes followed by oxidation in 100% oxygen for 2 hours at 650° C. The rhodium present in the rhodium oxide represented 99+% of the soluble rhodium originally present in the still heel.

EXAMPLE 2

The rhodium oxide recovered in Example 1 was dissolved by converting it to the carbonyl triphenyl phosphite complex in the following manner: Thirty milligrams of oxidized rhodium from Example 1 and 3 ml of triphenyl phosphite were heated in a shaker tube at 175° C. for 4 hours in the presence of 4,000 psig carbon monoxide. This procedure resulted in the dissolution of 99+% of the rhodium. The soluble rhodium exhibited normal catalytic activity when it was used in the hydroformylation of 2-vinyl-5-methyl-1,3-dioxane.

EXAMPLE 3

The precipitation and treatment of rhodium from a still heel was performed according to the procedure in Example 1 with the exception that no hydrogen peroxide was used. The rhodium content of the precipitate from ten different still heels ranged from 35% to 90% due to the presence of $Rh^{+3}$ organo phosphorus compound. The precipitate contained 99% of the rhodium present in the still heel.

EXAMPLE 4

The precipitation of rhodium from a still heel was performed according to the precedure in Example 1. The precipitate was 98% rhodium; it contained 99.5% of the rhodium present in the still heel. The precipitate was washed free of a still heel with methanol (pH 3.2), and oxidized with oxygen at 650° C. at 1 atmosphere for 4 hours, but no sodium borohydride treatment was used. Ninety-five percent of the rhodium was dissolved in triphenyl phosphite and carbon monoxide. Thus, the treatment without sodium borohydride did not result in a rhodium as highly dissolvable as with the borohydride.

EXAMPLE 5

The precipitation of rhodium from a still heel was performed according to the procedure in Example 1 with the exception that no 4N sodium hydroxide was added. The pH of the reaction mixture after precipitation was 1.85. Only 87.7% of the rhodium present in the still heel was recovered as a precipitate.

EXAMPLE 6

The precipitation of rhodium from a still heel was performed according to the procedure in Example 1 with the exception that tetramethylammonium hydroxide was used as the base instead of sodium hydroxide. The precipitate contained 99.4% of the rhodium present in the still heel.

EXAMPLE 7

The precipitation of rhodium from a still heel was performed according to the procedure in Example 1 with the exception that methyl ethyl ketone was used instead of methanol. The precipitate contained 98.5% of the rhodium present in the still heel.

EXAMPLE 8

The precipitation of rhodium from a still heel was performed according to the procedure in Example 1 with the exception that the hydrogen peroxide pretreatment of the still heel was replaced with oxygen treatment at 50 psig and 75° C. for 1.5 hours. The precipitate contained 96.3% of the rhodium present in the still heel.

EXAMPLE 9

The precipitation of rhodium from a still heel was performed according to the procedure in Example 8 with the exception that no water was added to the reaction mixture. No precipitate was produced.

EXAMPLE 10

The precipitation of rhodium from a still heel was performed according to the procedure in Example 1 with the exception that the reaction mixture was heated at 100° C. for 70 minutes. No precipitate was produced.

EXAMPLE 11

The procedures described in Examples 1 and 2 were performed with the exception that the purified rhodium precipitate was not oxidized prior to dissolution. Only 1.8% of the rhodium was dissolved.

EXAMPLE 12

The procedures described in Examples 1 and 2 were performed with the exception that dissolution of the oxidized rhodium in the presence of triphenyl phosphite was accomplished with 400 psig carbon monoxide at 175° C. for 2 hours. Dissolution of the rhodium was 94%.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:
1. A process for recovering rhodium that is present in a still heel from the hydroformylation of an unsaturated hydrocarbon, said still heel comprising rhodium triaryl phosphite complex catalyst, triaryl phosphite ligand and high boilers, said process comprising
  (a) pretreating the still heel with a mixture of (1) methanol, methyl ethyl ketone, acetone, ethanol, propanol, isopropanol, diethyl ketone, methyl propyl ketone, ethyl propyl ketone or mixtures thereof, (2) at least 5 ml of water per 100 g of still heel, (3) oxygen gas or a precursor thereof and (4) sufficient base to adjust the pH of the still heel after rhodium precipitation to from 2 to 7;
  (b) heating the mixture from (a) to a temperature of from 0° to 85° C. until the triaryl phosphite is oxidized to the corresponding phosphate compound; and
  (c) heating the mixture from (b) for from 15 minutes to 120 minutes at from 115° to 175° C. to precipitate zero valent rhodium.
2. The process of claim 1 wherein the compatible organic solvent is methanol.
3. The process of claim 1 wherein the pH of the solution in (b) is 3.0 to 6.0.
4. The process of claim 1 wherein the temperature in (b) is from 20° to 85° C.
5. The process of claim 1 wherein the temperature in (c) is from 150° to 165° C.
6. The process of claim 1 wherein at least 90% by weight of the rhodium present in the still heel is recovered.
7. The process of claim 1 wherein at least 99% by weight of the rhodium present in the still heel is recovered.
8. The process of claim 1 wherein the heating in (c) is done under an inert atmosphere.
9. The process of claim 1 wherein the rhodium precipitate is separated from the mixture, washed with a solvent-acid solution with a pH of from 3 to 4 and oxidized with oxygen at a temperature of from 300° to 900° C. to convert the rhodium to $Rh_2O_3$.
10. The process of claim 9 wherein at least 90% by weight of the rhodium in the still heel is recovered.
11. The process of claim 9 wherein at least 95% by weight of the oxidized rhodium is dissolved in a triaryl phosphite ligand and carbon monoxide.
12. The process of claim 1 wherein
  (d) the rhodium precipitate is separated from the mixture;
  (e) the rhodium precipitate is washed with a solvent-acid solution having a pH of from 3 to 4 to remove residual still heel;
  (f) the rhodium precipitate from (e) is treated with an alkaline reducing solution that will reduce the trivalent rhodium impurity to zero valent rhodium;
  (g) the rhodium from (f) is quenched with glacial acetic acid to destroy any residual reducing solution;
  (h) the rhodium from (g) is separated;
  (i) the rhodium from (h) is washed with an aqueous acetic acid solution with a pH of from 3 to 4;
  (j) the rhodium from (i) is dried in an inert atmosphere at a temperature of from 250° to 400° C.; and
  (k) the rhodium from (j) is oxidized with oxygen at a temperature of from 300° to 900° C. to convert the rhodium to $Rh_2O_3$.
13. The process of claim 12 wherein the compatible organic solvent in (a) is methanol.
14. The process of claim 12 wherein the acid in (e) is glacial acetic acid.
15. The process of claim 12 wherein the solvent in (e) is methanol.
16. The process of claim 15 wherein the acid in (e) is glacial acetic acid.
17. The process of claim 12 wherein the solvent in (e) is acetone.
18. The process of claim 17 wherein the acid in (e) is glacial acetic acid.
19. The process of claim 12 wherein the pH of the solution in (b) is 3 to 6.
20. The process of claim 12 wherein the temperature in (b) is from 20° to 85° C.
21. The process of claim 12 wherein the reducing solution is a solution of sodium borohydride.
22. The process of claim 12 wherein the drying is at a temperature of from 325° to 350° C.
23. The process of claim 12 wherein the oxidizing is at a temperature of from 625° to 650° C.
24. The process of claim 12 wherein at least 90% by weight of the rhodium from (k) is dissolved in a triaryl phosphite ligand and carbon monoxide.
25. The process of claim 12 wherein at least 95% by weight of the rhodium from (k) is dissolved in a triaryl phosphite and carbon monoxide.
26. The process of claim 12 wherein the heating in (c) is done under an atmosphere of nitrogen.
27. The process of claim 26 wherein the compatible organic solvent in (a) is methanol.
28. The process of claim 26 wherein the solvent in (e) is methanol.
29. The process of claim 26 wherein the acid in (e) is glacial acetic acid.
30. The process of claim 26 wherein the solvent in (e) is acetone.
31. The process of claim 28 wherein the acid in (e) is glacial acetic acid.
32. The process of claim 30 wherein the acid in (e) is glacial acetic acid.
33. The process of claim 26 wherein the pH of the solution in (b) is 3 to 6.
34. The process of claim 26 wherein the temperature in (b) is 20° to 85° C.
35. The process of claim 26 wherein the temperature in (c) is from 150° to 175° C.
36. The process of claim 26 wherein the reducing solution is a solution of sodium borohydride.
37. The process of claim 26 wherein the drying is at a temperature of from 325° to 350° C.
38. The process of claim 26 wherein the oxidizing is at a temperature of from 625° to 650° C.
39. The process of claim 26 wherein at least 90% by weight of the rhodium present in the still heel is recovered.
40. The process of claim 26 wherein at least 90% by weight of the rhodium from (k) is dissolved in a triaryl phosphite and carbon monoxide.
41. The process of claim 26 wherein at least 95% by weight of the rhodium from (k) is dissolved in a triaryl phosphite and carbon monoxide.

* * * * *